April 19, 1960

T. RACZ 2,932,975

MOTION TRANSMITTING DEVICE

Filed Aug. 11, 1959

INVENTOR.
Tibor Racz
BY
Michael S. Striker
Attorney

April 19, 1960 T. RACZ 2,932,975
MOTION TRANSMITTING DEVICE
Filed Aug. 11, 1959 3 Sheets-Sheet 3

INVENTOR.
Tibor Racz
BY
Michael S. Striker
Attorney

United States Patent Office 2,932,975
Patented Apr. 19, 1960

2,932,975
MOTION TRANSMITTING DEVICE
Tibor Racz, Madrid, Spain
Application August 11, 1959, Serial No. 832,929
Claims priority, application Spain August 13, 1958
20 Claims. (Cl. 74—86)

The present invention relates to a motion transmitting device, and more particularly to a motion transmitting device which can be utilized for driving a centrifugal separator.

It is an object of this invention to provide a motion transmitting device in which the operation of an unbalanced driven mass will be improved.

It is another object of this invention to connect an outer shaft and an inner shaft by a lost motion coupling means.

It is still another object of this invention to provide a motion transmitting device in which automatic self-centering is effected between an outer shaft and an inner shaft.

It is a further object of this invention to provide a motion transmitting device wherein automatic lubrication is obtained for the coupling means between an outer shaft and an inner shaft.

It is a still further object of this invention to provide between an outer shaft and an inner shaft, a lost motion coupling having a play in longitudinal, axial and transverse directions.

It is a still further object of this invention to provide a motion transmitting device including a hollow rotary outer shaft and an inner rotary shaft located within the outer shaft for rotation therewith, in which lubricating means absorb shocks between the inner shaft and the outer shaft during axial, radial and transverse relative movement.

With these objects in view, the present invention provides a motion transmitting device comprising, in combination, a rotary outer shaft having formed at one end thereof an axially extending cavity tapering from said end, driving means for rotating the outer shaft, a rotary inner shaft mounted in the cavity and projecting from said end and having an end portion turnably supported at the narrower end of the cavity for rotational and oscillatory movement and coupling means for coupling the inner shaft with the one end of the outer shaft for rotating therewith and having play at least in radial direction.

According to a preferred embodiment of the present invention, the lost motion coupling means couple the inner shaft with the outer shaft for rotation therewith and have play in radial, axial and circumferential direction.

According to a further aspect of the present invention, the motion transmitting device comprises a housing, a rotary vertical outer shaft mounted in the housing and having at the upper end thereof an axially extending cavity tapering from the end thereof and having an opening at the narrower end of the cavity, driving means located on the housing for rotating the outer shaft, a rotary vertical inner shaft mounted in the cavity and projecting from the end thereof and having a lower end portion turnably supported at the narrower end of the cavity for rotation and oscillatory movement. Also provided are coupling means for coupling the inner shaft with said one end of the outer shaft for rotation therewith, having play at least in radial direction and a lubricating liquid located in the housing, in the opening, and in the cavity. In this manner, rotation of the outer shaft will circulate the lubricating liquid through the opening up said cavity for lubricating the coupling means and through the housing.

According to a still further aspect of the present invention, the motion transmitting device comprises, a housing including wall portions defining a damping chamber having a bottom wall portion formed therein with a restricted aperture, and the vertical shaft having a lower end part located in the damping chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
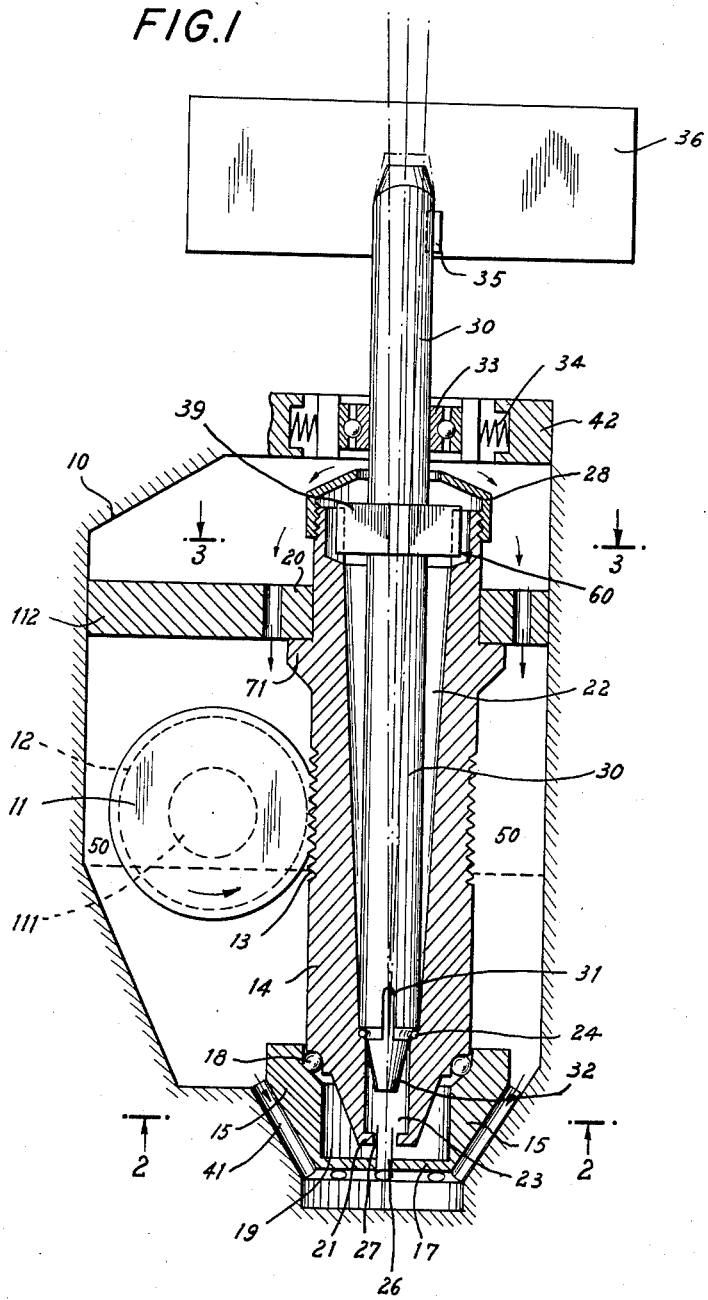
Fig. 1 is a sectional view of an embodiment of the present invention.
Figure 2:
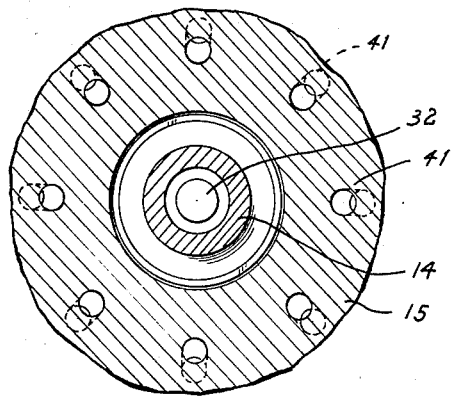
Fig. 2 is a sectional view of Fig. 1 along line 2—2 in the directions of the arrows.

Referring now to the drawings, a housing 10 contains the driving means 11, preferably in the form of a helicoidal gear having teeth 12 and a horizontal extending shaft 111. In mesh with the helicoid gear teeth 12 of the driving means 11 is the worm gear 13 on a hollow outer shaft 14. Housing 10 includes wall portions 15 and 16 and bottom wall portion 17 defining a damping chamber 19. Bearings 18 are mounted at the upper end of damping chamber 19 and bearings 20 are fixed to web 112 of housing 10. Rotatably mounted on bearings 18 and 20 is the outer shaft 14 having a lower end part 21 located in the damping chamber 19 and a shoulder 71 abutting bearing 20.

A downwardly tapering cavity 22 is formed in the upper end of outer shaft 14. At the lower end of the cavity 22 are located ball bearings 24. Below bearings 24 there is formed a cylindrical opening in outer shaft 14 indicated at 23 to define an inner damping chamber. A pipe 26 fixed to the bottom wall 17 of the housing 10 penetrates through an opening 27 into the inner damping chamber 23 without closing opening 27.

A rotary vertical inner shaft 30 includes a lower end portion having an upper part supported on the bearing 24 and a frusto-conical lower part 32 tapering downwardly and extending into the inner damping chamber 23. At least one slot 31 is formed on the inner shaft 30 in the region of the bearings 24 so that liquid contained in damping chamber 23 can pass through the slot 31 into the tapering cavity 22 of outer shaft 14.

Figure 3:
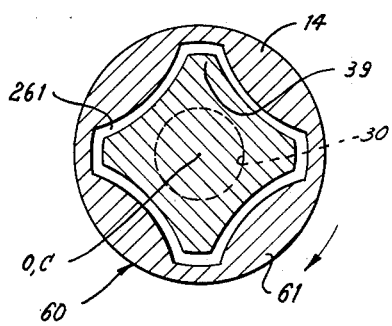
Fig. 3 is a sectional view of Fig. 1 along line 3—3 in the direction of the arrows.

Coupling means 60 are provided between outer shaft and the inner shaft 30. The coupling means preferably comprise projecting means 39 formed on inner shaft 30 and means 61 fixed to the outer shaft 14. Means 61 are formed with an opening 261 substantially matching the inner shaft in the region of the projecting means 39, the arrangement being that the inner surface of the opening 261 is spaced from the projecting means 39 when the axis of the outer shaft 14 coincides with the axis of the inner shaft 30 as is clearly shown in Fig. 3.

A baffle plate 28 is screwed onto the upper end of inner shaft 14. The upper part of inner shaft 30 is journaled in ball bearings 33. The bearings 33 are resiliently supported by coil springs 34 on a support 42 fixed to housing 10. Inner shaft 30 is drivingly connected to a driven mass 36 by key 35. Mass 36 is only diagrammatically indicated and will preferably be the main rotating part of a centrifugal separator, not illustrated, as it does not form part of the present invention.

Housing 10 is filled with a lubricating liquid up to the level indicated at 50. Holes 41 are provided in the bottom of housing 10 and the lubricating liquid passes through holes 41 into the pipe 26 and from there into the inner damping chamber 23 and the damping chamber 19 and up the cavity 22 up to the level of the lubricating liquid 50.

The device works as follows:

Worm wheel 11 will rotate the outer shaft 14 which is prevented from movement in axial, radial, or transverse direction by bearing 20 abutting shoulder 71 and by bearing 18. Coupling means 60 will ensure that inner shaft 30 rotates with outer shaft 14.

Rotation of the shafts will centrifugally move the lubricating liquid up the cavity 22 past the coupling means 60 to lubricate the same and over the baffle plate 28 to return the lubricating liquid into the housing for recirculation. The baffle plate plate 28 will ensure the further atomizing of the lubricating liquid and a splashing of the same against the bearing 33 to lubricate the same. A baffle plate is, however, not necessary as the centrifugal action ensures sufficient atomizing of the lubricating liquid to provide lubrication of all the moving parts of the device located above the liquid level 50.

Coupling means 60 have sufficient play to allow movement of shaft 30 in radial, axial and circumferential direction in relation to outer shaft 14. Any unbalance of the rotating mass 36 is not directly transmitted to outer shaft 14 and driving means 11. The stream of oil emerging from pipe 26 will give a damping effect to vertical and transverse radial movements of shaft 30 due to the fact that oil will fill the gap of the coupling means and that downwardly tapering end 32 is located in inner damping chamber 23. Should inner shaft 30 be lifted up vertically, a return downwardly will be dampened by the oil from pipe 26 together with the effect of the suitably dimensioned opening surrounding pipe 26 and the action of the inner damping chamber 23 and damping chamber 19. A similar damping effect will also be produced when inner shaft 30 oscillates radially and axially.

Coupling means 60, as illustrated in Figs. 3 to 7, will not only provide a lost motion both in radial, axial and circumferential direction, but will also provide a centering means for the inner shaft 30 in relation to outer shaft 14. The axis of outer shaft 14 is indicated as "O" and the axis of the inner shaft is indicated as "C" and the direction of rotation is indicated by an arrow.

Figure 4:
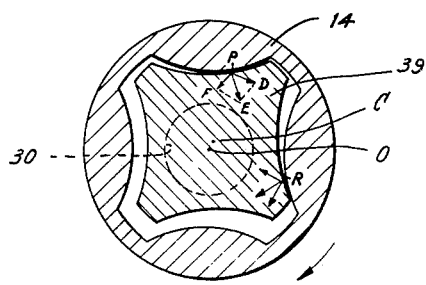
Figs. 4, 5, 6 and 7 are sections along lines 3—3 of Fig. 1 showing the respective parts in different operational positions.

If the inner shaft 30 deviates from a center as is shown in Fig. 4, a tangential force D with its normal component E at the contact point P generates a centering impulse F. Similar forces are created at the contact point R of Fig. 5 where the angle and the magnitude of the forces are indicated by arrows.

Figure 5:
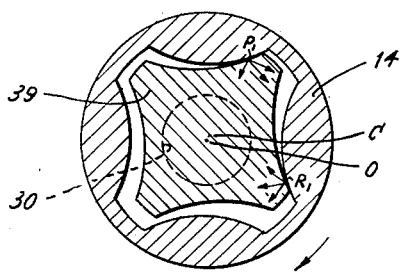

Another out-of-center position is illustrated in Fig. 5, where the contact points are represented as $P_1$ and $R_1$. It is to be observed in comparison between Figs. 4 and 5 that contact point R has moved to contact point $R_1$ by a rolling movement producing less wear than a sliding movement. The pressure of the oil between the surfaces will dampen the contact forces and will greatly reduce wear and noise of the moving parts.

Figure 6:
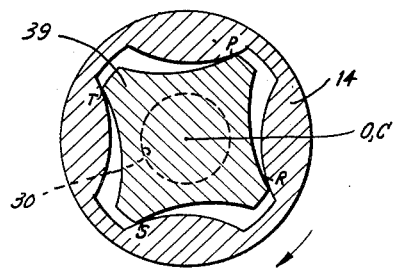
Figure 7:
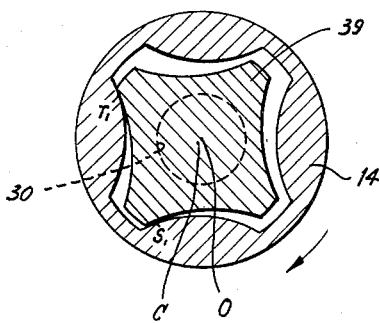

In Figs. 6 and 7, the contact points are T and $T_1$ and S and $S_1$, respectively; the forces are not illustrated as they are clearly shown in Figs. 4 and 5. The curves of the projection 39 and of the opening 261 are circular in cross section for ease of manufacture. It has been observed that the circular curve approximates for practical purposes sufficiently the ideal curves determined experimentally.

The projecting means are shown in Figs. 3 to 7 as a star with four projections and the opening 61 as a Maltese cross. It should however be understood that other numbers of projections could be used, say three or five.

Figure 8:
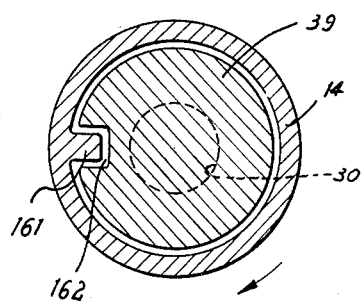
Fig. 8 is a sectional view corresponding to Fig. 3 and illustrating a modified construction.

A modification of the coupling means is shown in Fig. 8. Here a single projection 161 is provided on the outer shaft 14 and a recess 162 on the inner shaft 30. The projection 161 and the opening 162 are arranged radially. However, while a single projection cooperating with a single opening will provide lost motion in axial, radial and transverse oscillatory direction, it will not provide a centering force.

Figure 9:
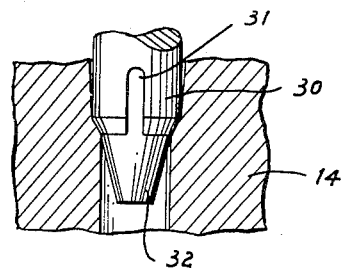
Fig. 9 is a fragmentary sectional view showing a modification of some parts illustrated in Fig. 1.

Fig. 9 illustrates a modification in which the ball bearings 24 are replaced by a conical taper at the lower end portion of inner shaft 30. The conical portion could also be replaced by a semi-spherical portion.

Figure 10:
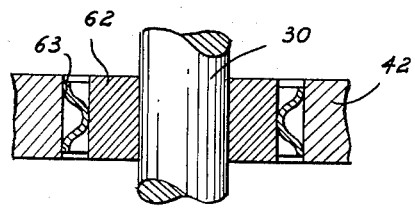
Fig. 10 is a fragmentary sectional view showing a modification of another part illustrated in Fig. 1.

Fig. 10 shows a modification of the ball bearing 33 in the form of a fixed bearing 62 resiliently supported by a leaf spring 63.

For smaller machines, a fixed bronze bearing 62 and a continuous leaf spring 63 as shown in Fig. 10 will be used. For heavier machines bearings 33 are provided and six coil springs 34 have been found sufficient.

The circulation of the lubricating liquid enables it to be cleaned and prevent accumulation of sediments on the bearings.

The amount of oil passing through pipe 26 concentric with the axis of the shafts can, if so desired, be increased by appropriate means, for example by a pump, so that the inner shaft 30 can be given an upward lift preventing undue pressure on the bearings 24. An increased amount of oil will of course also provide increased damping of other undesired movements of the inner shaft 30.

The lost motion driving connection between outer shaft 14 and the inner shaft 30 allows a certain amount of deceleration and acceleration in relation to each other and effects a better and easier change of velocity and a smoother and easier operation of the device.

The device according to the present invention allows a considerable increase of torque on the shafts 14 and 30 without undue increase of weight and size while keeping the driving means 11 small. The device according to the invention will also reduce the axial reaction of outer shaft 14 and reduce the tendency of the driving gear 11 to lift the roating mass 36. It further allows the outer shaft 14 to be mounted in rigid bearings securing the shaft 14 against axial and longitudinal movement.

It will be understood that each of the elements described above, or two or more together, may also find a useful application in other types of motion transmitting device differing from the types described above.

While the invention has been illustrated and described as embodied in driving shaft having play in axial, radial and circumferential direction in relation to the inner driven shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A motion transmitting device, comprising, in combination, a rotary outer shaft having formed at one end thereof an axially extending cavity tapering from said end; driving means for rotating said outer shaft; a rotary inner shaft mounted in said cavity and projecting from said end and having an end portion turnably supported at the narrower end of said cavity for rotational and oscillatory movement; and coupling means for coupling said inner shaft with said one end of said outer shaft for rotation therewith and having play at least in radial direction.

2. A motion transmitting device, comprising, in combination, a rotary outer shaft having formed at one end thereof an axially extending cavity tapering from said end; driving means for rotating said outer shaft; a rotary inner shaft mounted in said cavity and projecting from said end and having an end portion turnably supported at the narrower end of said cavity for rotational, axial and transverse oscillatory movement; and lost motion coupling means for coupling said inner shaft with said one end of said outer shaft for rotation therewith and having play in radial, axial and circumferential direction.

3. A motion transmitting device, comprising, in combination, a rotary outer shaft having formed at one end thereof an axially extending cavity tapering from said end; driving means for rotating said outer shaft; a rotary inner shaft mounted in said cavity and projecting from said end and having an end portion turnably supported at the narrower end of said cavity for rotational and oscillatory movement; and coupling means located at said one end of said outer shaft for coupling said inner shaft with said one end of said outer shaft for rotation therewith and having play at least in radial direction.

4. A motion transmitting device, comprising, in combination, a rotary outer shaft having formed at one end thereof an axially extending cavity tapering from said end and including gear means located at the circumference thereof; gear driving means in mesh with said gear means for rotating said outer shaft; a rotary inner shaft mounted in said cavity and projecting from said end and having an end portion turnably supported at the narrower end of said cavity for rotational and oscillatory movement; and coupling means for coupling said inner shaft with said one end of said outer shaft for rotation therewith and having play at least in radial direction.

5. A motion transmitting device, comprising, in combination, a rotary outer shaft having formed at one end thereof an axially extending cavity tapering from said end; ball bearing means located at the narrower end of said aperture; driving means for rotating said outer shaft; a rotary inner shaft mounted in said cavity and projecting from said end and having an end portion turnably supported on said ball bearing means at the narrower end of said cavity for rotational and oscillatory movement; and coupling means for coupling said inner shaft with said one end of said outer shaft for rotation therewith and having play at least in radial direction.

6. A motion transmitting device, comprising, in combination, a rotary outer shaft having formed at one end thereof an axially extending cavity tapering from said end; driving means for rotating said outer shaft; a rotary inner shaft mounted in said cavity and projecting from said end and having an end portion turnably supported at the narrower end of said cavity for rotational and oscillatory movement; a support; a bearing resiliently supported on said support and turnably supporting said inner shaft at the end projecting from said end of said outer shaft; and coupling means for coupling said inner shaft with said one end of said outer shaft for rotation therewith and having play at least in radial direction.

7. A motion transmitting device, comprising, in combination, a rotary vertical outer shaft having formed at one end thereof an axially extending cavity tapering from said end; driving means including a horizontally extending drive shaft for rotating said outer shaft; a rotary vertical inner shaft mounted in said cavity and projecting from said end and having an end portion turnably supported at the narrower end of said cavity for rotational and oscillatory movement; and coupling means for coupling said inner shaft with said one end of said outer shaft for rotation therewith and having play at least in radial direction.

8. A motion transmititng device, comprising, in combination, a housing; a rotary vertical outer shaft mounted in said housing and having formed at the upper end thereof an axially extending cavity tapering from said end and having an opening at the narrower end of said cavity; driving means located on said housing for rotating said outer shaft; a rotary vertical inner shaft mounted in said cavity and projecting from said end and having a lower end portion turnably supported at the narrower end of said cavity for rotational and oscillatory movement; coupling means for coupling said inner shaft with said one end of said outer shaft for rotation therewith and having play at least in radial direction; and a lubricating liquid located in said housing, in said opening, and in said cavity, whereby rotaton of said outer shaft will circulate said lubricating liquid through said opening, up said cavity for lubricating said coupling means and through said housing.

9. A motion transmitting device, comprising, in combination, a housing; a rotary vertical outer shaft mounted in said housing and having formed at the upper end thereof an axially extending cavity tapering from said end and having an opening at the narrower end of said cavity; driving means located on said housing for rotating said outer shaft; a rotary vertical inner shaft mounted in said cavity and projecting from said end and having a lower end portion turnably supported at the narrower end of said cavity for rotational and oscillatory movement; lost motion coupling means for coupling said inner shaft with said one end of said outer shaft for rotation therewith and having play in radial and circumferential direction; and a lubricating liquid located in said housing, in said opening, and in said cavity, whereby rotation of said outer shaft will circulate said lubricating liquid through said opening, up said cavity for lubricating said coupling means and through said housing.

10. A motion transmitting device, comprising, in combination, a housing; a rotary vertical outer shaft mounted in said housing and having formed at the upper end thereof an axially extending cavity tapering from said end and having an opening at the narrower end of said cavity; driving means located on said housing for rotating said outer shaft; a rotary vertical inner shaft mounted in said cavity and projecting from said end and having a lower end portion turnably supported at the narrower end of said cavity for rotation and oscillatory movement; coupling means located at said one end of said outer shaft for coupling said inner shaft with said one end of said outer shaft for rotation therewith and having play at least in radial direction; and a lubricating liquid located in said housing, in said opening, and in said cavity, whereby rotation of said outer shaft will circulate said lubricating liquid through said opening, up said cavity for lubricating said coupling means and through said housing.

11. A motion transmitting device, comprising, in combination, a housing; a rotary vertical outer shaft including gear means located at the circumference thereof, mounted in said housing and having formed at the upper end thereof an axially extending cavity tapering from said end and having an opening at the narrower end of said cavity; gear driving means in mesh with said gear means located on said housing for rotating said outer shaft; a rotary vertical inner shaft mounted in said cavity and projecting from said end and having a lower end portion turnably supported at the narrower end of said cavity for rotational and oscillatory movement; coupling means for coupling said inner shaft with said one end of said outer shaft for rotation therewith and having play at least in radial direction; and a lubricating liquid located in said housing, in said opening, and in said cavity, whereby rotation of said outer shaft will circulate said lubricating liquid through said opening, up said cavity for lubricating said coupling means and through said housing.

12. A motion transmitting device, comprising, in combination, a housing; a rotary vertical outer shaft mounted in said housing and having formed at the upper end thereof an axially extending cavity tapering from said end and having an opening at the narrower end of said cavity; ball bearings located at the narrower end of said aperture; driving means located on said housing for rotating said outer shaft; a rotary vertical inner shaft mounted in said cavity and projecting from said end and having a lower end portion turnably supported on said ball bearings at the narrower end of said cavity for rotational and oscillatory movement; coupling means for coupling said inner shaft with said one end of said outer shaft for rotation therewith and having play at least in radial direction; and a lubricating liquid located in said housing, in said opening, and in said cavity, whereby rotation of said outer shaft will circulate said lubricating liquid through said opening, up said cavity for lubricating said coupling means and through said housing.

13. A motion transmitting device, comprising in combination, a housing; a rotary vertical outer shaft mounted in said housing and having formed at the upper end thereof an axially extending cavity tapering from said end and having an opening at the narrower end of said cavity; driving means located on said housing for rotating said outer shaft; a rotary vertical inner shaft mounted in said cavity and projecting from said end and having a lower end portion turnably supported at the narrower end of said cavity for rotational and oscillatory movement; coupling means for coupling said inner shaft with said one end of said outer shaft for rotation therewith and having play at least in radial direction; a support; an upper bearing resiliently supported on said support and turnably supporting said inner shaft at the end projecting from said end of said outer shaft; and a lubricating liquid located in said housing, in said opening, and in said cavity, whereby rotation of said outer shaft will circulate said lubricating liquid through said opening, up said cavity for lubricating said coupling means and through said housing.

14. A motion transmitting device, comprising in combination, a housing including wall portions defining a damping chamber having a bottom wall portion formed therein with a restricted aperture; a rotary vertical shaft having a lower end part located in said damping chamber, said shaft having at the upper end thereof an axially extending cavity tapering from said end and having an opening at the narrower end of said cavity defining an inner damping chamber with an opening formed at the bottom end of said inner damping chamber; driving means located on said housing for rotating said shaft; another rotary vertical shaft mounted in said cavity and projecting from said end and having a lower end portion having an upper part supported at the narrower of said aperture for rotational, axial and transverse oscillatory movement and a downwardly tapering lower part located in said inner damping chamber; lost motion coupling means for coupling said shaft with said one end of said other shaft for rotation therewith and having play in a radial, circumferential and vertical direction; upper bearing means resiliently supported on said housing and turnably supporting said other shaft at the end projecting from said end of said shaft; and a lubricating liquid located in said housing and flowing into said damping chamber through said aperture, through said opening into said inner damping chamber, through said cavity and said housing whereby rotation of said shafts will circulate said liquid through said aperture, said damping chamber, said opening and said inner damping chamber to lubricate said coupling means and said upper bearing means and dampen out vertical, axial and transverse oscillatory movement of said other shaft.

15. A motion transmitting device, comprising, in combination, a housing including wall portions defining a damping chamber having a bottom wall portion formed therein with a restricted aperture; a rotary vertical shaft having a lower end part located in said damping chamber, said shaft having at the upper end thereof an axially extending cavity tapering from said end and having an opening at the narrower end of said cavity defining an inner damping chamber with an opening formed at the bottom end of said inner damping chamber; driving means located on said housing for rotating said shaft; another rotary vertical shaft mounted in said cavity and projecting from said end and having a lower end portion having an upper part supported at the narrower of said aperture for rotational, axial and transverse oscillatory movement and a downwardly tapering lower part located in said inner damping chamber, said other shaft having formed at the circumference thereof at least one groove extending in axial direction in the region of the upper part of said lower end portion; lost motion coupling means for coupling said shaft with said one end of said other shaft for rotation therewith and having play in a radial, circumferential and vertical direction; upper bearing means resiliently supported on said housing and turnably supporting said other shaft at the end projecting from said end of said shaft; and a lubricating liquid located in said housing and flowing into said damping chamber through said aperture, through said opening into said inner damping chamber, through said groove, through said cavity and said housing whereby rotation of said shafts will circulate said liquid through said aperture, said damping chamber, said opening and said inner damping chamber to lubricate said coupling means and said upper bearing means and dampen out vertical, axial and transverse oscillatory movement of said other shaft.

16. A motion transmitting device, comprising, in combination, a housing including wall portions defining a damping chamber having a bottom wall portion formed therein with a restricted aperture; a rotary vertical shaft having a lower end part located in said damping chamber, said shaft having at the upper end thereof an axially extending cavity tapering from said end and having an opening at the narrower end of said cavity defining an inner damping chamber with an opening formed at the bottom end of said inner damping chamber; driving means located on said housing for rotating said shaft; another rotary vertical shaft mounted in said cavity and projecting from said end and having a lower end portion having an upper part supported at the narrower of said aperture for rotational, axial and transverse oscillatory movement and a downwardly tapering lower part located in said inner damping chamber; lost motion coupling means for coupling said shaft with said one end of said other shaft for rotation therewith and having play in a radial, circumferential and vertical direction, said coupling means including projecting means on one of said shafts and means fixedly connected to the other of said shafts having an opening formed therein substantially matching said one shaft in the region of the said projecting means, the inner surfaces of said opening being spaced from said projecting means when the axis of said one shaft coincides with the axis of said other shaft; upper bearing means resiliently supported on said housing and turnably supporting said other shaft at the end projecting from said end of said shaft; and a lubricating liquid located in said housing and flowing into said damping chamber through said aperture, through said opening into said inner damping chamber, through said cavity and said housing whereby rotation of said shafts will circulate said liquid through said aperture, said damping chamber, said opening and said inner damping chamber to lubricate said coupling means and said upper bearing means and dampen out vertical, axial and transverse oscillatory movement of said other shaft.

17. A motion transmitting device, comprising, in combination, a housing including wall portions defining a damping chamber having a bottom wall portion formed therein wtih a restricted aperture; a rotary vertical shaft having a lower end part located in said damping chamber, said shaft having at the upper end thereof an axially extending cavity tapering from said end and having an opening at the narrower end of said cavity defining an inner damping chamber with an opening formed at the bottom end of said inner damping chamber; driving means located on said housing for rotating said shaft; another rotary vertical shaft mounted in said cavity and projecting from said end and having a lower end portion having an upper part supported at the narrower of said aperture for rotational, axial and transverse oscillatory movement and a downwardly tapering lower part located in said inner damping chamber, said other shaft having formed at the circumference thereof at least one groove extending in axial direction in the region of the upper part of said lower end portion; lost motion coupling means for coupling said shaft with said one end of said other shaft for rotation therewith and having play in a radial, circumferential and vertical direction, said coupling means including projecting means on one of said shafts and means fixedly connected to the other of said shafts having an opening formed therein substantially matching said one shaft in the region of the said projecting means, the inner surfaces of said opening being spaced from said projecting means when the axis of said one shaft coincides with the axis of said other shaft; upper bearing means resiliently supported on said housing and turnably supporting said other shaft at the end projecting from said end of said shaft; and a lubricating liquid located in said housing and flowing into said damping chamber through said aperture, through said opening into said inner damping chamber, through said cavity and said housing whereby rotation of said shafts will circulate said liquid through said aperture, said damping chamber, said opening and said inner damping chamber to lubricate said coupling means and said upper bearing means and dampen out vertical, axial and transverse oscillatory movement of said other shaft.

18. A motion transmitting device, comprising, in combination, a rotary outer shaft having formed at one end thereof an axially extending cavity tapering from said end and including gear means located at the circumference thereof; ball bearing means located at the narrower end of said aperture; gear driving means in mesh with said gear means for rotating said outer shaft; a rotary inner shaft mounted in said cavity and projecting from said end and having an end portion turnably supported on said ball bearing means at the narrower end of said cavity for rotational, axial and transverse oscillatory movement; a support; a bearing resiliently supported on said support and turnably supporting said inner shaft at the end projecting from said end of said outer shaft; and lost motion coupling means for coupling said inner shaft with said one end of said outer shaft for rotation therewith and having play in radial, axial, and circumferential direction.

19. A motion transmitting device, comprising, in combination, a housing; a rotary vertical outer shaft mounted in said housing and having formed at the upper end thereof an axially extending cavity tapering from said end and having an opening at the narrower end of said cavity; ball bearings located at the narrower end of said aperture; driving means located on said housing for rotating said outer shaft; a rotary vertical inner shaft mounted in said cavity and projecting from said end and having a lower end portion turnably supported on said ball bearings at the narrower end of said cavity for rotational and oscillatory movement; coupling means located at said one end of said outer shaft for coupling said inner shaft with said one end of said outer shaft for rotation therewith and having play at least in radial direction; and a lubricating liquid located in said housing, in said opening, and in said cavity, whereby rotation of said outer shaft will circulate said lubricating liquid through said opening, up said cavity for lubricating said coupling means and through said housing.

20. A motion transmitting device, comprising, in combination, a housing including wall portions defining a damping chamber having a bottom wall portion formed therein with a restricted aperture; a rotary vertical shaft having a lower end part located in said damping chamber, said shaft having at the upper end thereof an axial extending cavity tapering from said end and having an opening at the narrower end of said cavity defining an inner damping chamber with an opening formed at the bottom end of said inner damping chamber; driving means located on said housing for rotating said shaft; another rotary vertical shaft mounted in said cavity and projecting from said end and having a lower end portion having an upper part supported at the narrower of said aperture for rotational, axial and transverse oscillatory movement and a downwardly tapering lower part located in said inner damping chamber; lost motion coupling means for coupling said shaft with said one end of said other shaft for rotation therewith and having play in a radial, circumferential and vertical direction, said coupling means including a plurality of projections on one of said shafts and means fixedly connected to the other of said shafts having a plurality of openings formed therein substantially matching said one shaft on the region of said projections, the inner surface of each opening being spaced from the respective projection when the axis of said one shaft coincides with the axis of said other shaft; upper bearing means resiliently supported on said housing and turnably supporting said other shaft at the end projecting from said end of said shaft; and a lubricating liquid located in said housing and flowing into said damping chamber through said restricted aperture, through said opening into said inner damping chamber, through said cavity and said housing whereby rotation of said shafts will circulate said liquid through said aperture, said damping chamber, said opening and said inner damping chamber to lubricate said coupling means and said upper bearing means and dampen out vertical, axial and transverse oscillatory movement of said other shaft.

References Cited in the file of this patent
UNITED STATES PATENTS

| | | |
|---|---|---|
| 729,596 | Johnsrud | June 2, 1903 |
| 897,916 | Myers | Sept. 8, 1908 |
| 1,674,605 | Mortensen | June 19, 1928 |
| 2,757,860 | Thylefors | Aug. 7, 1956 |